United States Patent
Perez et al.

(10) Patent No.: US 10,572,269 B2
(45) Date of Patent: Feb. 25, 2020

(54) RESUMING A SYSTEM USING STATE INFORMATION

(71) Applicant: Hewlett-Packard Development Company, L.P., Houston, TX (US)

(72) Inventors: Taciano Perez, Porto Alegre (BR); Carlos Haas Costa, Palo Alto, CA (US); Joao Claudio Ambrosi, Porto Alegre (BR); Diego Rahn Medaglia, Porto Alegre (BR); Mauricio Nunes Porto, Porto Alegre (BR); Roberto Bender, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 182 days.

(21) Appl. No.: 15/306,681

(22) PCT Filed: Apr. 29, 2014

(86) PCT No.: PCT/US2014/035836
§ 371 (c)(1),
(2) Date: Oct. 25, 2016

(87) PCT Pub. No.: WO2015/167455
PCT Pub. Date: Nov. 5, 2015

(65) Prior Publication Data
US 2017/0046176 A1 Feb. 16, 2017

(51) Int. Cl.
*G06F 12/00* (2006.01)
*G06F 9/4401* (2018.01)
(Continued)

(52) U.S. Cl.
CPC .......... *G06F 9/4418* (2013.01); *G06F 3/0625* (2013.01); *G06F 3/0655* (2013.01);
(Continued)

(58) Field of Classification Search
None
See application file for complete search history.

(56) References Cited

U.S. PATENT DOCUMENTS

| 6,564,286 B2 | 5/2003 | DaCosta |
| 2009/0164771 A1* | 6/2009 | Reece ................ G06F 1/3203 713/2 |

(Continued)

FOREIGN PATENT DOCUMENTS

| CN | 102708064 | 10/2012 |
| CN | 102804141 | 11/2012 |
| CN | 103270488 | 8/2013 |

OTHER PUBLICATIONS

Hewlett-Packard Development Company, L.P., International Appl. No. PCT/US2014/012433 filed Jan. 22, 2014 (37 pages).

*Primary Examiner* — Daniel D Tsui
(74) *Attorney, Agent, or Firm* — Trop Pruner & Hu PC (57) ABSTRACT

A non-volatile main memory stores state information of at least one program executing in the system, and metadata indicating whether a system is to be resumed to a prior state on a next start. As part of restarting the system from a mode in which power is removed from the system, the system is resumed to the prior state using the state information stored in the non-volatile main memory, in response to the metadata indicating that the system is to be resumed to the prior state.

15 Claims, 5 Drawing Sheets

(51) Int. Cl.
*G06F 3/06* (2006.01)
*G06F 11/14* (2006.01)
*G06F 13/16* (2006.01)

(52) U.S. Cl.
CPC .......... *G06F 3/0679* (2013.01); *G06F 9/4401* (2013.01); *G06F 11/1438* (2013.01); *G06F 13/16* (2013.01); *G06F 2206/1014* (2013.01)

(56) References Cited

U.S. PATENT DOCUMENTS

| | | |
|---|---|---|
| 2010/0205421 A1 | 8/2010 | Campbell |
| 2010/0262853 A1 | 10/2010 | Goda |
| 2012/0102347 A1 | 4/2012 | Hobson |
| 2012/0166840 A1 | 6/2012 | Rothman et al. |
| 2012/0221843 A1 | 8/2012 | Bak et al. |
| 2013/0124842 A1* | 5/2013 | Oh .................... H04N 1/00885 713/2 |
| 2013/0290759 A1 | 10/2013 | Kumar et al. |
| 2014/0075087 A1 | 3/2014 | Bartling et al. |
| 2014/0075232 A1 | 3/2014 | Bartling et al. |

\* cited by examiner

RESUMING A SYSTEM USING STATE INFORMATION

BACKGROUND

An electronic device can include a main memory and secondary storage. The main memory of an electronic device can be implemented with one or multiple volatile memory devices. A volatile memory device loses its data if power is removed from the memory device. The secondary storage can be implemented using one or multiple non-volatile (or persistent) storage devices. A non-volatile storage device retains its content even if power is removed from the non-volatile storage device.

BRIEF DESCRIPTION OF THE DRAWINGS

Some implementations are described with respect to the following figures.

DETAILED DESCRIPTION

In an electronic device that includes a volatile main memory and a non-volatile secondary storage, data that is to be persisted across a power cycle of the electronic device is first stored into the non-volatile secondary storage before power is removed from the electronic device. A power cycle of the electronic device can refer to a sequence that includes removing power from (at least some components in) the electronic device, followed by re-applying power to the electronic device. When power is removed from components of the electronic device, the volatile main memory will not retain its data; however, data stored in the non-volatile secondary storage is retained.

Examples of electronic devices can include any or some combination of the following: desktop computers, notebook computers, tablet computers, server computers, smart phones, personal digital assistants, mobile phones, communication devices, storage servers, game appliances, and so forth. More generally, an electronic device can be referred to as a "system." A system can also refer to an arrangement of multiple electronic devices.

An electronic device can have an "instant on" feature, in which the electronic device is resumed to a state of the electronic device that existed prior to the time that the electronic device was placed into a lower power mode in which power is removed from some or all the components in the electronic device. A lower power mode can include an off mode of the electronic device (where no power is applied at all to the electronic device), or another mode where power is removed from some of the components of the electronic device. To enable the resumption of the electronic device to the prior state, state information can be stored into the non-volatile secondary storage of the electronic device. The prior state of the electronic device can refer to a state at a time when one or multiple programs are executing. Resuming the electronic device to the prior state can refer to resuming the electronic to begin execution starting from the prior state.

Resuming to a prior state using state information stored in the non-volatile secondary storage can be faster than booting the electronic device (booting the electronic device causes the electronic device to be placed into an initial state). However, the secondary storage can be implemented with storage device(s) with a slower access speed than a memory device(s) used to implement the main memory. As a result resumption to the prior state using state information stored in the secondary storage can still be a relatively slow process.

In accordance with some implementations, an electronic device can be resumed to a prior state using state information stored in a non-volatile main memory in the electronic device. A non-volatile main memory is a main memory (which can be implemented with one or multiple memory devices) in which data stored in the non-volatile main memory is retained even if power is removed from components (including the non-volatile main memory) in the electronic device. Power can be removed from components in the electronic device when the electronic device is placed into a lower power mode, such as an off mode, a hibernation mode, a sleep mode, and so forth.

State information stored in the non-volatile main memory can be retained even if power is removed from the non-volatile main memory in the lower power mode of the electronic device. State information can include information regarding a current state of an operating system, a current state of certain application programs, a current state of certain hardware devices, and so forth. State information can also include data used by the operating system, application programs, hardware devices, and so forth.

As an example, prior to the electronic device transitioning to a lower power mode, a document being processed by an application program may be open. The state information of the application program can indicate the open document and the current content of the document, such that when the electronic device is resumed to a prior state (by using the state information) from the lower power mode, the document remains open with the content that existed when the electronic device was placed into the lower power mode.

Since the non-volatile main memory can be implemented with one or multiple memory devices having an access speed greater than the access speed of a non-volatile secondary storage, the resumption of the electronic device to a prior state using the state information stored in the non-volatile main memory can be performed more quickly than a resumption using state information stored in a non-volatile secondary storage. Also, because data does not have to be copied from the non-volatile main memory to non-volatile secondary storage before power is removed, the resumption can be faster since the same data does not have to be copied from the non-volatile secondary storage to the non-volatile main memory after power is resumed.

A main memory can refer to a memory that is accessible by a processor in the electronic device over a memory bus. In other words, the main memory is not accessed over an input/output (I/O) bus of the electronic device, which can be a bus with a communication speed that is lower than the communication speed of the memory bus. If secondary storage exists in the electronic device, the secondary storage is connected to the I/O bus of the electronic device, such that access of data in the secondary storage would have to occur over the I/O bus and not over the memory bus.

A further characteristic of a main memory according to some implementations is that individual bytes of data in the main memory can be directly addressed by the processor, for reading or writing by the processor, regardless of the size of a word employed by the processor. A "word" can refer to a block of data of a specified size that is operated upon by instructions executing on the processor. Although a "byte" may refer to 8 bits of data in some examples, it is noted that in other examples, a byte can refer to a larger or smaller number of bits.

Figure 1A:
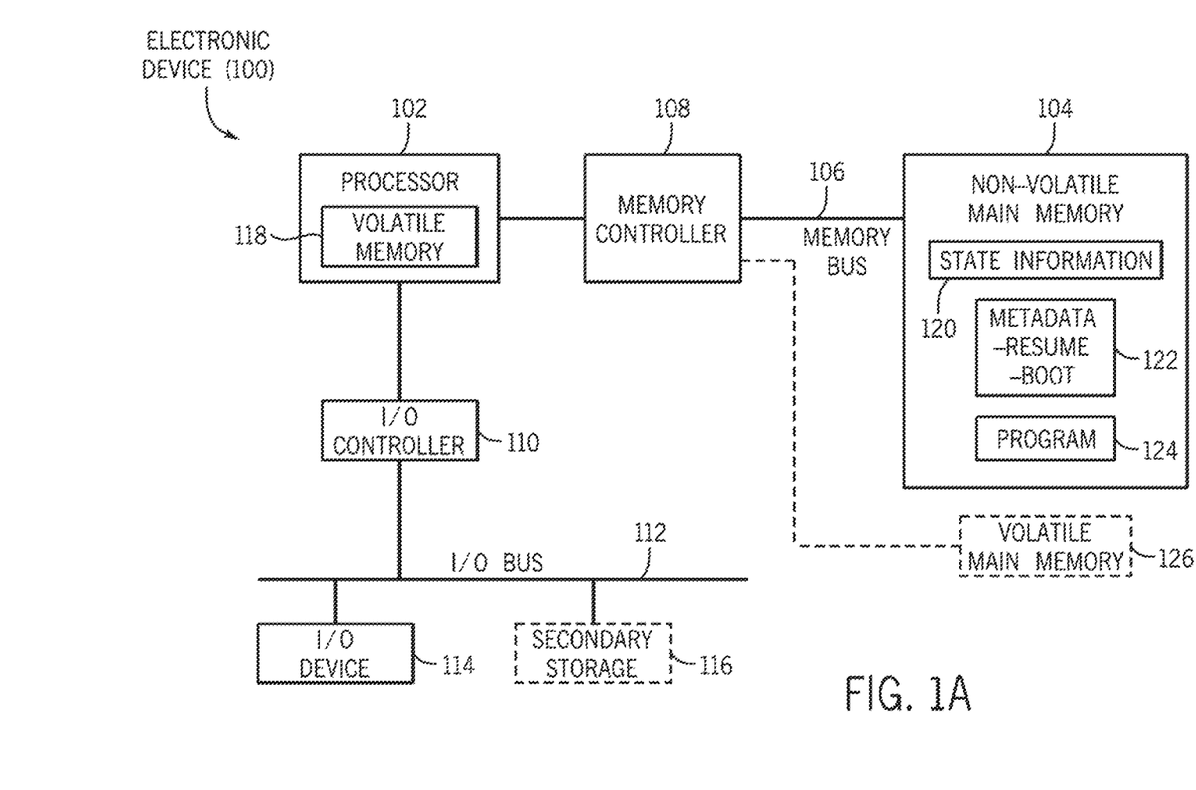
FIGS. 1A and 1B are block diagrams of example electronic devices according to various implementations.

FIG. 1A is a block diagram of an example electronic device 100 according to some implementations. The electronic device 100 includes a processor 102 and a non-volatile main memory 104. A processor can include a microprocessor, microcontroller, processor module or subsystem, programmable integrated circuit, programmable gate array, or another control or computing device.

Examples of memory devices that can be used to in the non-volatile main memory 104 can include any or some combination of the following: a resistive random access memory (RRAM), a memristor memory, a phase-change random access memory (PCRAM), a magnetoresistive random access memory (MRAM), a spin-transfer torque random access memory (STT-RAM), or a battery-backed dynamic random access memory (e.g. NV-DIMM), or a memory of any other technology that is non-volatile, directly addressable by the processor, and can be used as main memory.

The non-volatile main memory 104 is accessible over a memory bus 106, which includes control signal lines and data signal lines. Control signal lines are used to carry control signals to the non-volatile main memory 104 for performing accesses (reads and/or writes) of the non-volatile main memory 104. The data signal lines of the memory bus 106 are used for carrying data (read data and/or write data).

A memory controller 105 controls access of the non-volatile main memory 104. In response to a request from the processor 102, where the request can be a read request, write request, load request, store request, or other request that involves an access of the non-volatile main memory 104, the memory controller 106 can submit corresponding control signals over the memory bus 106 to perform the requested access of the non-volatile main memory 104.

The electronic device 100 also includes an I/O controller 110, which is connected between the processor 102 and an I/O bus 112. One or multiple I/O devices 114 are connected to the I/O bus 112. In addition, if a secondary storage 116 (disk-based storage such as a hard disk drive or an optical disk drive, or a solid state storage such as flash memory) is present in the electronic device 100, the secondary storage 116 can be connected to the I/O bus 112. In other examples, the secondary storage 116 can be omitted from the electronic device 100, such that the electronic device 100 is without any secondary storage.

The processor 102 performs an access of devices connected to the I/O bus 112 through the I/O controller 110. As an example, if the secondary storage 116 is present in the electronic device 100, then an access of the secondary storage 116 occurs through the I/O controller 110 and over the bus 112. Although the I/O controller 110 is shown as being separate from the memory controller 108, it is noted that in alternative implementations, the memory controller 108 can be part of the I/O controller 110. As yet further examples, the memory controller 108 and/or the I/O controller 110 can be part of the processor 102.

Although just one processor 102 is depicted in FIG. 1A, it is noted that in other examples, the electronic device 100 can include multiple processors.

The processor 102 can also include volatile memory 118, which can include any or some combination of the following: a cache memory (or multiple cache memories), registers, and so forth.

In accordance with some implementations, the non-volatile main memory 104 can store state information 120 and metadata 122. The non-volatile main memory 104 can also store machine-readable instructions of one or multiple programs 124, such as an operating system, an application program, a firmware module, and so forth. As a further example, the program 124 can be a hypervisor, which refers to machine-readable instructions that can create and run virtual machines. A virtual machine emulates a physical machine. A virtual machine can include an operating system and an application. The hypervisor virtualizes hardware components of a physical machine for use by the virtual machines.

The state information 120 includes information associated with a current state of programs in the electronic device 100. The state information 120 can include at least a portion of the volatile memory 118 of the processor 102, data used by programs, and so forth. The state information 120 stored in the non-volatile main memory 104 can be considered a snapshot of a state of programs at a particular point in time. In some examples, multiple snapshots can be taken of the state of the programs at multiple time points; in such examples, resumption from a lower power mode to a prior state can be based on state information in a selected one of the snapshots.

During a restart of the electronic device 100 from a lower power mode in which power is removed from components (including the non-volatile main memory 104) of the electronic device 100, the state information 120 can be used by the processor 102 to resume the electronic device 100 to a prior state that existed prior to power being removed from the components of the electronic device 100.

The metadata 122 can store an indication of whether the system is to be resumed from a prior state (using the state information 120) or is to be booted on a next start of an electronic device 100. If the metadata 122 indicates that the electronic device 100 is to be resumed to a prior state on the next start, then the processor 102 would use the state information 120 to resume the electronic device 100 to the prior state. On the other hand, if the metadata 122 indicates that the electronic device 100 is to boot on the next start, then the state information 120 can be discarded or ignored, and the processor 102 can boot the electronic device 100 to an initial state.

In some examples, the electronic device 100 may also include a volatile main memory 126, in addition to the non-volatile main memory 104. The volatile main memory 126 loses its content in response to power being removed from the volatile main memory 126. In examples where the volatile main memory 126 is present in the electronic device 100, selected content of the volatile main memory 126 can be copied to the non-volatile main memory 104 as part of the state information 120.

Figure 1B:
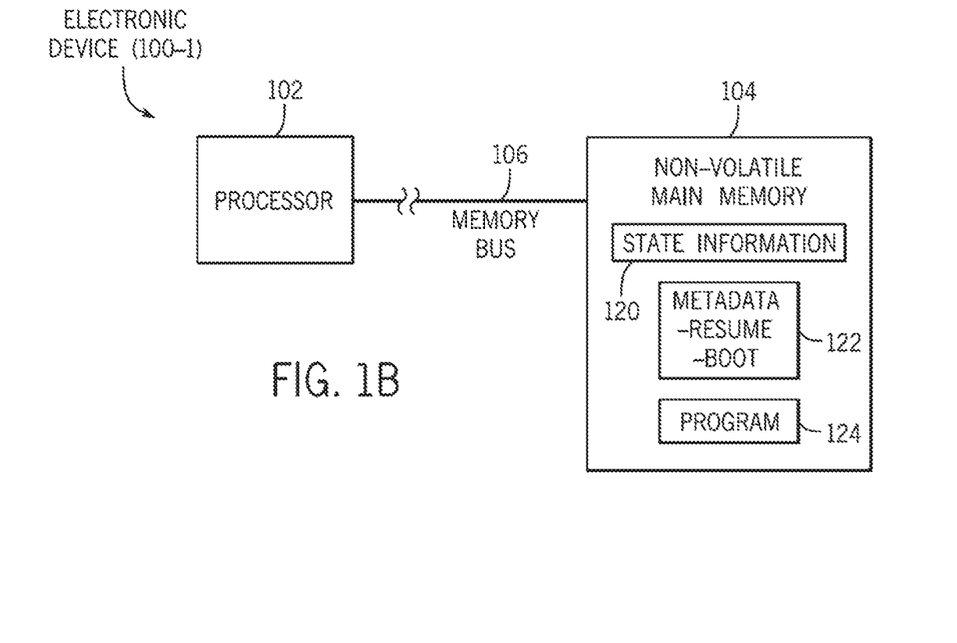

FIG. 18 is a block diagram of an electronic device 100-1 according to further implementations. The electronic device 100-1 includes several components present in the electronic device 100 of FIG. 1A, but not other components in the electronic device 100 of FIG. 1A. For example, the electronic device 100-1 includes the processor 102 and the non-volatile main memory 104, which stores the state information 120, the metadata 122, and at least one program 124.

Figure 2:
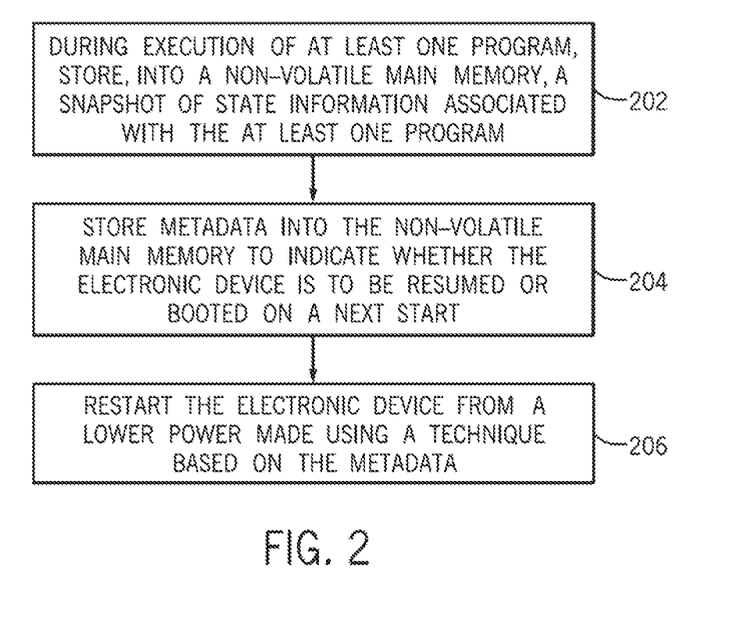
FIG. 2 is a flow diagram of an example process according to some implementations.

FIG. 2 is a flow diagram of a process according to some implementations. The process of FIG. 2 can be performed by machine-readable instructions executing on the processor 102. During execution of at least one program (e.g. program 124) in the electronic device (e g 100 or 100-1), the processor 102 can store (at 202), into the non-volatile main memory 104, a snapshot of state information associated with the at least one program. This stored state information is represented as state information 120 in FIG. 1A or 1B.

Also, metadata 122 can be stored (at 204) into the non-volatile main memory 104, where the metadata 122 can indicate whether the electronic device is to be resumed from a prior state or to be booted on a next start.

Assuming that the electronic device has been placed into a lower power mode in which power is removed from components of the electronic device, the electronic device can be restarted (at 206) from the lower power mode using one of several techniques, based on the stored metadata 122. If the metadata 122 indicates that the electronic device is to be resumed from a prior state, the processor 102 resumes the electronic device using the snapshot of the state information 120 stored in the non-volatile main memory 104. On the other hand, if the metadata 122 indicates that the electronic device is to be booted, then the processor 102 boots the electronic device.

Figure 3:
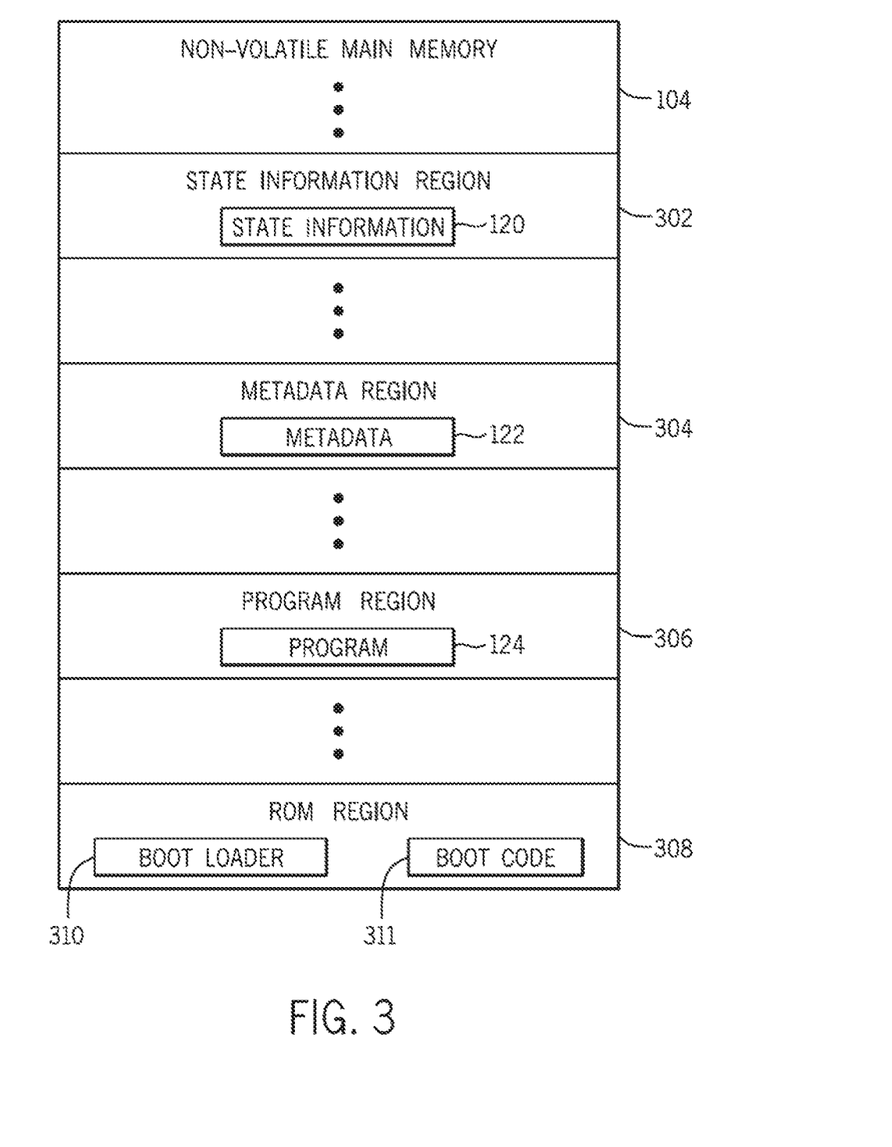
FIG. 3 is a schematic diagram of example content of a non-volatile main memory, according to some implementations.

FIG. 3 is a schematic diagram of various regions within the non-volatile main memory 104, according to further examples. The non-volatile main memory 104 can include a state information region 302 to store the state information 120. The non-volatile main memory 104 can also include a metadata region 304 to store the metadata 122. Additionally, the non-volatile main memory 104 can include a program region 306 to store the at least one program 124. It is noted that multiple program regions 306 can be provided for respective different programs, such as application programs, an operating system, a hypervisor, and so forth.

In some examples, the non-volatile main memory 104 can also include a read-only memory (ROM) region 308. The ROM region 308 can be used to store information traditionally stored by a ROM in an electronic device. Traditionally, a ROM can be implemented using an erasable and programmable read-only memory (EPROM), an electrically erasable and programmable read-only memory (EEPROM), a flash memory, and so forth. The ROM can store information, including data and instructions, used for booting or resuming an electronic device. In some examples, it is assumed that the electronic device 100 or 100-1 of FIG. 1A or 1B is without a ROM. In such examples, the ROM region 308 can be provided in the non-volatile main memory 104. In alternative examples, the electronic device 100 or 100-1 can include a ROM, in which case the ROM region 308 can be omitted from the non-volatile main memory 104.

In FIG. 3, the ROM region 308 includes a bootloader 310, which includes machine-readable instructions that are used to load other code, such as further boot code (e.g. 311 shown in FIG. 3) or an operating system or hypervisor. The bootloader 310 can be one of the first machine-readable instructions executed by the processor 102 when the electronic device boots or resumes.

In examples where the electronic device 100 or 100-1 is without a volatile main memory (e.g. without the volatile main memory 126 of FIG. 1A), the program 124 and the bootloader 310 can be executed in place. Executing machine-readable instructions in place in a given memory can refer to executing the machine-readable instructions stored in the given memory without first copying the machine-readable instructions to another memory.

In alternative examples, the electronic device 100 can be provided with a volatile main memory, such as volatile main memory 126 depicted in FIG. 1A. In such alternative examples, the program 124 and/or the bootloader 310 can be first loaded into the volatile main memory 126 before executing the program 124 and/or bootloader 310.

Figure 4:
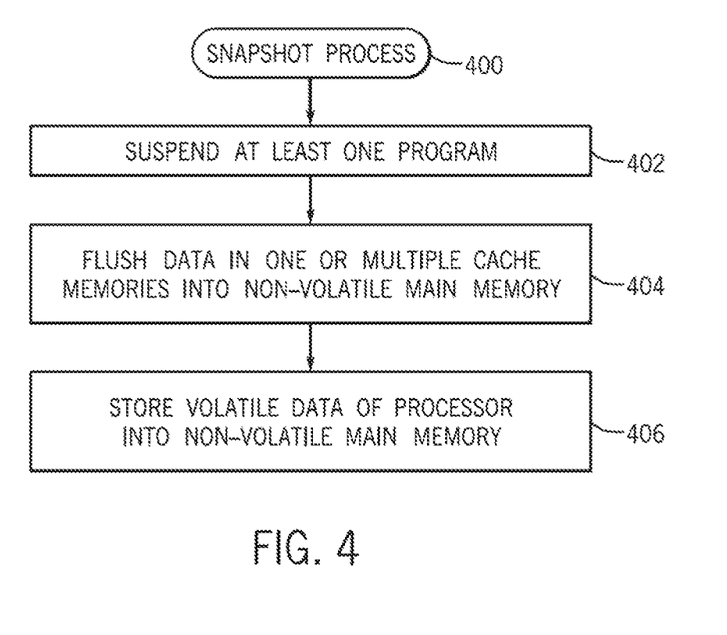
FIG. 4 is a flow diagram of an example snapshot process, according to further implementations.

FIG. 4 is a flow diagram of a snapshot process 400 of taking a snapshot of state information of an executing program (or programs). The snapshot process 400 can be performed by an operating system, a hypervisor, or other machine-readable instructions executable on the processor 102. When an event occurs indicating that a snapshot of state information is to be taken, the snapshot process suspends (at 402) the executing program(s). Suspending a program refers to temporarily halting the execution of the program.

After suspending the program(s), the snapshot process 400 can flush (at 404) data in one or multiple volatile cache memories. Flushing data from a volatile cache memory can refer to writing data that has been modified from the cache memory to the non-volatile main memory 104, to synchronize the data in the cache memory with the data in the non-volatile main memory 104. Note that the one or multiple cache memories can be part of the volatile memory 118 in the processor 102 shown in FIG. 1A.

In addition, the snapshot process 400 can store (at 406) other volatile data in the volatile memory 118 of the processor 102 into the non-volatile main memory 104. If there are multiple processors, then the volatile data of such multiple processors are stored into the non-volatile main memory 104.

The snapshot process 400 can be invoked in response to various events. For example, the snapshot process 400 can be performed after a successful boot of the electronic device 100. Alternatively, the snapshot process 400 can be performed at specific time intervals, such as periodically or intermittently. Also, the snapshot process 400 can be performed in response to a request to place the electronic device 100 into a lower power mode.

Figure 5:
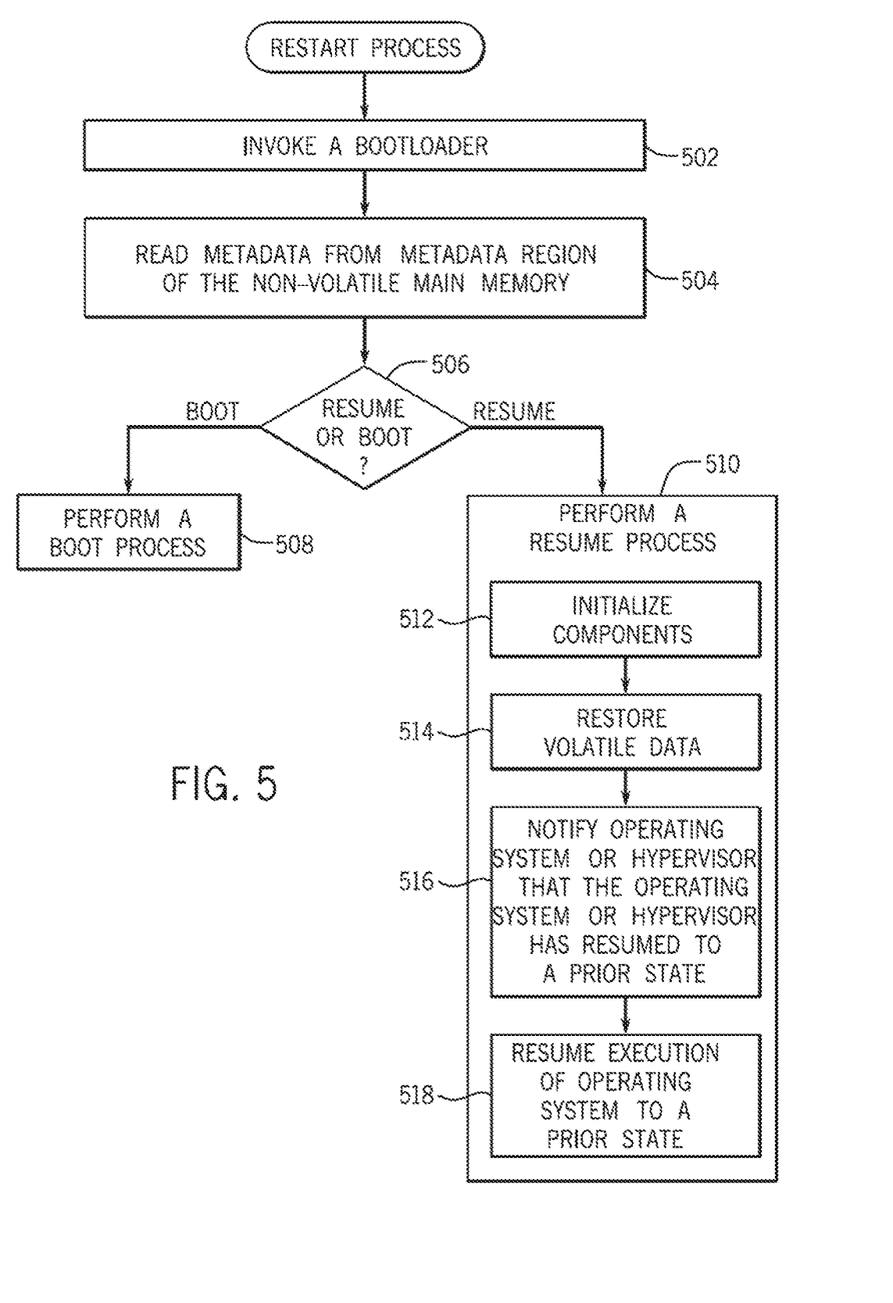
FIG. 5 is a flow diagram of an example restart process, according to further implementations.

FIG. 5 is a flow diagram of a restart process 500 performed in the electronic device that includes the non-volatile main memory 104, but which does not include the volatile main memory 126. The restart process 500 is performed when the electronic device (100 or 100-1) is restarted from a lower power mode in which power has been removed from components of the electronic device 100. To perform restart, the processor 102 invokes (at 502) the bootloader 310 from the ROM region 308 of the non-volatile main memory 104 (FIG. 3). In examples where the electronic device includes a ROM, the bootloader 310 can alternatively be invoked from the ROM.

Once invoked, the bootloader 310 reads (at 504) the metadata 122 stored in the metadata region 304 of the non-volatile main memory 104. The bootloader 310 reads the metadata 122 to determine whether the electronic device is to be resumed to a prior state, or whether the electronic device is to be booted. Although reference is made to the bootloader 310 reading the metadata 122, it is noted that in other examples, the bootloader 310 can invoke another program to read the metadata 122.

Based on the metadata 122, the bootloader 310 decides (at 506) whether to resume or boot the electronic device. If the decision is to boot, then a boot process is performed (at 508). However, if the decision is to resume the electronic device, then a resume process is performed (at 510), as discussed below. The resume process may be performed by code (e.g.

boot code 311 or other code) invoked by the bootloader 310. In the resume process, various components in the electronic device 100 are initialized (at 512). Initializing the components can refer to setting the components to an initial state.

In addition, volatile data can be restored (at 514) to the volatile memory 118 of the processor 102. The volatile data can be part of the state information 120 in the non-volatile main memory 104, for example.

The operating system, or hypervisor, is notified (at 516) that the operating system, or hypervisor, has resumed to a prior state. The notification can be performed by setting an indicator to a specified value. The operating system, or hypervisor, can also be notified of which components of the electronic device have been initialized.

Next, the operating system resumes execution (at 518) to the prior state, based on the state information 120 stored in the non-volatile main memory 510.

In alternative implementations in which the electronic device (100 or 100-1) includes a volatile main memory (e.g. 126 in FIG. 1A), further tasks in addition to those discussed above can be performed. For example, the snapshot process 400 of FIG. 4 can be modified to further include storing selected data of the volatile main memory 126 into the non-volatile main memory 104. A full snapshot or a partial snapshot can be taken of the content of the volatile main memory 126. A full snapshot involves copying the entire content of the volatile main memory 126 to the non-volatile main memory 104. A partial snapshot involves copying a portion (less than the entirety) of the content of the volatile main memory 126 to the non-volatile main memory 104.

Additionally, the restart process 500 can be modified to include an additional task relating to restoring the partial or full snapshot from the non-volatile main memory 104 to the volatile main memory 126.

A partial snapshot of the content of the volatile main memory 126 can include certain selected content in the volatile main memory 126, such as content relating to the kernel of the operating system and content relating to selected one or multiple application programs. Performing a partial snapshot can allow for faster resume, since the amount of data that has to be restored from the non-volatile main memory 104 to the volatile main memory 126 as part of a restart process can be reduced.

Various machine-readable instructions discussed above can be stored in a non-transitory machine-readable or computer-readable storage medium (or storage media), such as the non-volatile main memory 104, volatile main memory 126, and secondary storage 116.

Such machine-readable or compute readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   a non-volatile main memory to store state information of at least one program executing in the system, and metadata indicating whether the system, on a next start, is to be resumed to a prior state of the system when the at least one program was executing or to be booted,
      wherein while the system is powered on prior to transitioning to a lower power mode, the state information and the metadata are written to the non-volatile main memory; and
   at least one processor to:
      as part of restarting the system from a mode in which power is removed from the system, resume the system to the prior state using the state information stored in the non-volatile main memory, in response to the metadata indicating that the system is to be resumed to the prior state.

2. The system of claim 1, wherein the at least one processor is to resume the system as part of the restarting of the system in response to the metadata containing a first indication.

3. The system of claim 2, wherein the at least one processor is to boot the system as part of the restarting of the system in response to the metadata containing a second indication.

4. The system of claim 1, wherein the at least one processor includes a volatile memory to store volatile data, and wherein the resuming includes restoring the volatile data to the volatile memory using the state information.

5. The system of claim 1, wherein the at least one program includes an operating system, wherein the resuming includes continuing execution of the operating system starting from the prior state using the state information.

6. The system of claim 1, wherein the system is without a volatile main memory.

7. The system of claim 1, wherein the system is without a non-volatile secondary storage.

8. The system of claim 1, further comprising:
   a volatile main memory, wherein the resuming restores data to the volatile main memory using the state information.

9. The system of claim 1, further comprising a memory bus, wherein the non-volatile main memory is accessible by the at least one processor over the memory bus without use of an input/output bus.

10. A method comprising:
    during execution of at least one program in a system, storing, into a non-volatile main memory, a snapshot of state information associated with the at least one program;
    storing metadata into the non-volatile main memory, while the system is powered on and prior to transitioning to a lower power mode, to indicate whether the system, on a next start, is to be resumed to a prior state of the system when the at least one program was executing or to be booted; and
    as part of restarting the system from a mode in which power is removed from the system,
       if the metadata indicates that the system is to be resumed to the prior state, resuming the system to the prior state using the snapshot of the state information stored in the non-volatile main memory, and
       if the metadata indicates that the system is to be booted, booting the system.

11. The method of claim 10, wherein the system includes a memory bus, the method further comprising:
    accessing, by a processor of the system, the non-volatile main memory over the memory bus.

12. The method of claim 11, wherein the system further includes an input/output (I/O) bus separate from the memory bus, the method further comprising:
   accessing, by the processor, a secondary storage over the I/O bus and not the memory bus.

13. The method of claim 10, further comprising suspending the at least one program prior to storing the snapshot of the state information in the non-volatile main memory.

14. An article comprising at least one non-transitory machine-readable storage medium storing instructions that upon execution cause a system to:
   during execution of at least one program in a system, store, into a non-volatile main memory, state information associated with the at least one program;
   store metadata into the non-volatile main memory, while the system is powered on and prior to transitioning to a lower power mode, to indicate whether the system, on a next start, is to be resumed from a prior state of the system when the at least one program was executing; and
   as part of restarting the system from a mode in which power is removed from the system,
   invoke a bootloader;
   cause, by the bootloader, reading of the metadata in the non-volatile main memory; and
   in response to determining that the metadata indicates that the system is to be resumed from the prior state, resume the system to the prior state using the state information stored in the non-volatile main memory.

15. The article of claim 14, wherein the non-volatile main memory is accessible by a processor over a memory bus that is separate from an input/output (I/O) bus.

* * * * *